United States Patent [19]

Inagaki et al.

[11] Patent Number: 5,757,412
[45] Date of Patent: May 26, 1998

[54] APPARATUS FOR PRODUCING OPTICAL DISC AND METHOD OF PRODUCTION THEREOF

[75] Inventors: Minoru Inagaki; Toru Aida, both of Kanagawa, Japan

[73] Assignee: Sony Corporation, Tokyo, Japan

[21] Appl. No.: 679,247

[22] Filed: Jul. 12, 1996

[30] Foreign Application Priority Data

Jul. 13, 1995 [JP] Japan .................................. 7-177272

[51] Int. Cl.⁶ .................................................. B41J 2/47
[52] U.S. Cl. .................................. 347/247; 369/54
[58] Field of Search .............................. 347/248, 247, 347/237; 369/54, 56, 58

[56] References Cited

U.S. PATENT DOCUMENTS 5,563,862  10/1996  Udagawa .................... 369/54

FOREIGN PATENT DOCUMENTS

| 0626680 | 11/1994 | European Pat. Off. | G11B 7/125 |
| 5012580 | 1/1980 | Japan | G11B 19/10 |
| 1139939 | 12/1984 | Japan | G11B 7/09 |
| 0117447 | 6/1985 | Japan | G11B 19/12 |
| 1116642 | 5/1989 | Japan | G03F 7/00 |

*Primary Examiner*—Mark Reinhart
*Attorney, Agent, or Firm*—Jay H. Maioli

[57] ABSTRACT

An apparatus for producing an optical disc which optically records desired information on an optical disc master provided with a signal generating unit for generating information which is to be recorded on the optical disc master; a light emitting unit for modulating the light emitted from the light emitting unit to the optical disc master; a head moving unit for moving relative to the optical disc master a head mounting an optical system; a position detecting unit for detecting the position of the head moving unit with respect to the optical disc master; a recording unit, and a controlling unit for reading a series of the set operating information, comparing the radial information of the optical disc master and the reading from the position detecting unit, and performing the control for irradiating the modulated light in accordance with the signal output from the signal generating unit to the optical disc master.

13 Claims, 6 Drawing Sheets

FIG.4

| NO. | RADIAL INFORMATION: RADIAL POSITION (mm) | UNIT OPERATING INFORMATION — SIGNAL SYSTEM FLAG |||||||| MECHANICAL FLAG |||||||||||||| S CHANGE ||
|---|---|---|---|---|---|---|---|---|---|---|---|---|---|---|---|---|---|---|---|---|---|---|---|
| | | 7 | 6 | 5 | 4 | 3 | 2 | 1 | 0 | 7 | 6 | 5 | 4 | 3 | 2 | 1 | 0 | 12 | 11 | 10 | 9 | 8 | 2 | 1 | 0 |
| 1 | 21.5 | 0 | 0 | 0 | 0 | 0 | 0 | 0 | 0 | 0 | 0 | 0 | 0 | 0 | 0 | 0 | 0 | 0 | 0 | 0 | 0 | 0 | 2 | 1 | 0 |
| 2 | 21.0 | 0 | 0 | 0 | 0 | 0 | 0 | 0 | 0 | 0 | 0 | 0 | 0 | 0 | 0 | 1 | 1 | 1 | 0 | 0 | 0 | 1 | 0 | 0 | 0 |
| 3 | 22.0 | 0 | 0 | 0 | 0 | 0 | 0 | 0 | 0 | 0 | 0 | 0 | 0 | 0 | 1 | 0 | 0 | 0 | 0 | 0 | 1 | 0 | 0 | 0 | 0 |
| 4 | LAST | 0 | 0 | 0 | 0 | 0 | 0 | 0 | 1 | 1 | 0 | 0 | 0 | 0 | 0 | 0 | 0 | 0 | 0 | 0 | 0 | 0 | 0 | 0 | 0 |
| 5 | · | | | | | | | 0 | 0 | 0 | 0 | | | | | | | | | | | | | | |
| 6 | · | | | | | | | 0 | 0 | 0 | 0 | | | | | | | | | | | | | | |
| 7 | · | | | | | | | 0 | 0 | 0 | 0 | | | | | | | | | | | | | | |
| 8 | · | | | | | | | 0 | 0 | 0 | 0 | | | | | | | | | | | | | | |
| 9 | · | | | | | | | 0 | 0 | 0 | 0 | | | | | | | | | | | | | | |
| 10 | · | | | | | | | 0 | 0 | 0 | 0 | | | | | | | | | | | | | | |
| 11 | · | | | | | | | 0 | 0 | 0 | 0 | | | | | | | | | | | | | | |
| 12 | · | | | | | | | 0 | 0 | 0 | 0 | | | | | | | | | | | | | | |
| 13 | · | | | | | | | 0 | 0 | 0 | 0 | | | | | | | | | | | | | | |
| 14 | · | | | | | | | 0 | 0 | 0 | 0 | | | | | | | | | | | | | | |
| 15 | · | | | | | | | 0 | 0 | 0 | 0 | | | | | | | | | | | | | | |
| 16 | · | | | | | | | 0 | 0 | 0 | 0 | | | | | | | | | | | | | | |
| 17 | MAXIMUM VALUE | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | MAXIMUM VALUE | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG.5A

SIGNAL SYSTEM FLAG:

| | | | |
|---|---|---|---|
| 7 | READY ........ 1:READY | , 0:NO |
| 6 | INITIALIZE ... 1:INITIALIZE | , 0:NO |
| 5 | PLAY ......... 1:PLAY | , 0:NO |
| 4 | END .......... 1:END | , 0:NO |
| 3 | NOT USED | |
| 2 | NOT USED | |
| 1 | NOT USED | |
| 0 | NOT USED | |

FIG.5B

MECHANICAL FLAG:

| | |
|---|---|
| 12 | EXISTENCE OF CHARACTER .. 1:YES, 0:NO |
| 11 | UPPER SIGNIFICANT BIT OF CONTROL FLAG ⎫ |
| 10 | MEDIUM SIGNIFICANT BIT OF CONTROL FLAG ⎬ FIG. 5(D) |
| 9 | LOWER SIGNIFICANT BIT OF CONTROL FLAG ⎭ |
| 8 | FEED MOTION DIRECTION .. 1:IN(FROM OUTER CIRCUMFERENCE TO INNER CIRCUMFERENCE), 0:OUT(FROM INNER CIRCUMFERENCE TO OUTER CIRCUMFERENCE) |
| 7 | COMPLETE END |
| 6 | NOT USED |
| 5 | PREPARATION AND EXECUTION OF CUTTING(SECOND AND SUBSEQUENT PROCESSES) |
| 4 | END PROCESSING AND START OF LOW SPEED MOVEMENT TO NEXT PROCESS |
| 3 | END PROCESSING AND START OF HIGH SPEED MOVEMENT TO NEXT PROCESS |
| 2 | PREPARATION AND EXECUTION OF CUTTING(FIRST AND SUBSEQUENT PROCESSES) |
| 1 | DECELERATION OF FEED SPEED FROM HIGH SPEED TO LOW SPEED |
| 0 | INITIAL SETTING OF CUTTING |

FIG.5C

S CHANGE:
| | |
|---|---|
| 2 | UPPER SIGNIFICANT BIT |
| 1 | MEDIUM SIGNIFICANT BIT |
| 0 | LOWER SIGNIFICANT BIT |

| CONTROL FLAG | | | NAME | FUNCTION |
|---|---|---|---|---|
| 11 | 10 | 9 | | |
| 0 | 0 | 0 | CLV-1 | CLV SIGNAL SYSTEM EXISTS (DESIGNATE CONDITION ROM) |
| 0 | 0 | 1 | CLV-2 | CLV SIGNAL SYSTEM DOES NOT EXIST (DESIGNATE CONDITION ROM) |
| 0 | 1 | 0 | CAV-1 | 1200rpm, 32 μm/sec (2X SPEED) |
| 0 | 1 | 1 | CAV-2 | 600rpm, 16 μm/sec (1X SPEED) |
| 1 | 0 | 0 | CAV-3 | 1800rpm, 48 μm/sec (3X SPEED) |
| 1 | 0 | 1 | CAV-4 | 2400rpm, 64 μm/sec (4X SPEED) |
| 1 | 1 | 0 | CAV-5 | CAV OF PSEUDO CLV (DESIGNATE CONDITION ROM) |
| 1 | 1 | 1 | CAV-6 | EXTERNAL REFERENCE SIGNAL (SP, FD) |

FIG.5D

| CHG FLAG | | | NO. | FUNCTION |
|---|---|---|---|---|
| 2 | 1 | 0 | | |
| 0 | 0 | 0 | 0 | GEN-A |
| 0 | 0 | 1 | 1 | GEN-B |
| 0 | 1 | 0 | 2 | GEN-C |
| 0 | 1 | 1 | 3 | GEN-D |
| 1 | 0 | 0 | 4 | BEAM ON |
| 1 | 0 | 1 | 5 | |
| 1 | 1 | 0 | 6 | BEAM OFF (SHUTTER OFF) |
| 1 | 1 | 1 | 7 | CHARACTER SIGNAL |

APPARATUS FOR PRODUCING OPTICAL DISC AND METHOD OF PRODUCTION THEREOF

BACKGROUND OF THE INVENTION

1. Field of the Invention

The present invention relates to an apparatus for producing an optical disc of a type which emits a laser beam in accordance with the data which is to be recorded such as video or audio data to an optical disc master to expose the same so as to record information on the optical disc master.

2. Description of the Related Art

There is known, for example, apparatuses for producing optical discs (disc cutting machines) which record the desired data on a master for a CD (compact disc) on which audio and various other information are recorded, a Mini-Disc (MD, trademark of Sony Corporation) on which sound is recorded, a digital video disc (DVD) on which audio and video data are recorded, or another optical disc and use it to produce such optical discs.

As such apparatuses for producing optical discs, there are known press type apparatuses for producing optical discs which use a press etc. to record the desired data on the optical disc master and optical type apparatuses for producing optical discs which emit a laser beam modulated in accordance with the data which is to be recorded on to the optical data master to expose the same, then uses photo-optical processing to thereby record that data on the optical disc master have been known. The present invention particularly relates to an apparatus for producing an optical disc performing the latter optical processing.

Below, an explanation will be given of an apparatus for producing an optical disc by optical processing.

The apparatus for producing an optical disc by performing optical processing modulates a laser beam by a pattern in accordance with the information to be recorded and emits it onto an optical disc master on the surface of which a photoresist or the like is uniformly coated to expose the same and thereby record the desired data on the optical disc master, that is, performs the disc cutting process.

An apparatus for producing optical discs is configured so as to be able to record various types of data on compact disc, Mini-Disc, digital video disc, and other various types of optical disc masters from the viewpoint of being able to be used for the production of current, of course, and also future optical discs. For this reason, a conventional apparatus for producing optical discs is intended to be able to handle all operations which might be performed irrespective of whether they are performed in the actual cutting processing. One method for this is to build in a series of execution routines in a programmable controller as software in advance and, in the middle of performing the cutting processing using that programmable controller, have the programmable controller make a decision on the conditions and, based on the result of that decision, selectively execute the operations recorded as software in the programmable controller.

In the above apparatus for producing optical discs mentioned above, however, since all of the operations which might be performed when recording data on the various optical disc masters are recorded in advance in the programmable controller as software indicating a series of execution routines, there are the problems that the structure of the software becomes complex, errors frequently occur, the work time becomes longer, the work load involved in the design, the complicated software becomes greater, and the price becomes high.

Further, during the operation of the apparatus for producing optical discs, the only processing routines which can be executed are those in the software recorded in the programmable controller in the manner as mentioned above. However, processing routines frequently change. In a related art apparatus for producing optical discs in which all of the software is built in the programmable controller, therefore it suffers from the disavantage that it is difficult to flexibly handle the variety of changes in circumstances which occur during its execution. That is, where for example it is desired to change the processing routine along with a change in the specifications of the optical disc master etc., it is necessary to reconstruct the entire software and so it suffers from the disadvantage in view of the work load and price.

SUMMARY OF THE INVENTION

The present invention was made in consideration with the above disadvantages of the related art and has as an object thereof to provide an apparatus and method for producing an optical disc which can reduce the work load involved in the program design and can record various types of data on various types of optical disc masters at a low cost.

The present invention has as another object to provide an apparatus and method for producing an optical disc which enables the user of the apparatus for producing the optical disc to easily and flexibly handle dynamic changes in circumstances at the time of execution of the software, changes in the specifications of the disc masters, etc.

An apparatus for producing an optical disc according to the present invention, which optically records desired information on an optical disc master, is provided with a signal generating means for generating information which is to be recorded on the optical disc master; a light emitting means having a light emitting means and a light modulating means for modulating the light emitted from the light emitting means by the information from the signal generating means and emitting the modulated light to the optical disc master; a head moving means for moving relative to the optical disc master a head mounting an optical system for irradiating the light from the light emitting means to a predetermined position of the optical disc master; a position detecting means for detecting the position of the head moving means with respect to the optical disc master; a recording means in which the format of the optical disc master, the type of the information which is to be recorded on the optical disc master, radial information of the optical disc master, the operating conditions of the head moving means, and the operating state of the apparatus for producing an optical disc are preliminarily set as a series of data; and a controlling means for reading a series of the set operating information, comparing the radial information of the optical disc master and the reading from the position detecting means, and performing the control for irradiating the modulated light in accordance with the signal output from the signal generating means to the optical disc master based on the set operating information in accordance with the position of the head moving means with respect to the optical disc master.

Preferably, the controlling means has a first controlling means for performing sequence control based on the set operating information and performing movement control of the head moving means and a second controlling means for performing a decision on the conditions by comparing the set radial information of the optical disc master and the position signal from the position detecting means and controlling the first controlling means.

The first controlling means preferably has a programmable logic controller.

Further, the second controlling means preferably has a memory in which the operating information is recorded; a comparator for performing the decision on the conditions by comparing the radial information recorded in the memory and the position signal from the position detecting means; and a memory pointer for proceeding to the next operating information recorded in the memory in accordance with the result of the comparison and decision of the comparator. The second controlling means may be constituted by a programmable logic array or a computation controlling means.

Preferably, the signal generating means has a plurality of signal generating devices for generating the signal which is to be recorded in accordance with a plurality of types of optical disc masters and the first controlling means selects the recording information designated based on the operating information and makes the light emitting means output the recording information.

Further, the method of producing an optical disc according to the present invention, which optically records desired information on an optical disc master, has a step of preliminarily setting the format of the optical disc master, the type of the information which is to be recorded on the optical disc master, the radial information of the optical disc master, the operating conditions of a head moving means, and the operating state of the apparatus for producing an optical disc as a series of data; a step of placing the optical disc master which is to be recorded on at a predetermined position; a cutting step of optically recording the recording information from a signal generating means on the optical disc master based on the set operating information; and a step of removing the optical disc master on which the recording information is recorded from the predetermined position.

Preferably, in the cutting step, the set series of operating information is read by using a controlling means; the radial information of the optical disc master and the reading from a position detecting means for detecting the position of a head with respect to the optical disc master are compared; and the light modulated in accordance with the signal output from the signal generating means to the optical disc master is irradiated to the optical disc master based on the set operating information in accordance with the position of a head moving means for moving the head with respect to the optical disc master.

Alternatively, the apparatus for producing an optical disc according to the present invention has a laser emitting means for emitting the laser beam; a moving means for moving the laser emitting means and the optical disc master relative to each other; a position detecting means for detecting the position of the optical disc master to which the laser beam is emitted; a memory means for storing a plurality of position information concerning the position of the optical disc master and a plurality of operating information corresponding to the position information; a comparing means for comparing the position detected by the position detecting means and the position indicated by the position information and detecting a coincidence thereof; and a controlling means for performing a predetermined control based on the next operating information when a coincidence is detected by the comparing means.

The recording information which is to be written on the optical disc master is given from the signal generating means. The second controlling means performs the decision on the conditions of the set operating information, and the first controlling means performs the control processing based on the decision on the conditions based on the set operating conditions. Both of the first controlling means and the second controlling means perform data oriented processing based on the set operating information. Accordingly, it is sufficient so far as the first controlling means and the second controlling means have the fundamental processing functions for processing the set operating information. The only change of the conditions for recording the recording information from the signal generating means on to the optical disc master 1 need be the change of the operating information.

BRIEF DESCRIPTION OF THE DRAWINGS

These and other objects and features of the present invention will become clearer from the following description of the preferred embodiments made with reference to the appended drawings in which:

FIG. 4 is a view of one example of radial information and unit operating information stored in a memory shown in FIG. 3; and FIGS. 5A to 5D are views of the contents of the unit operating information shown in FIG. 4.

DESCRIPTION OF THE PREFERRED EMBODIMENTS

Below, an explanation will be made of an apparatus for producing an optical disc according to an embodiment of the present invention.

Figure 1:
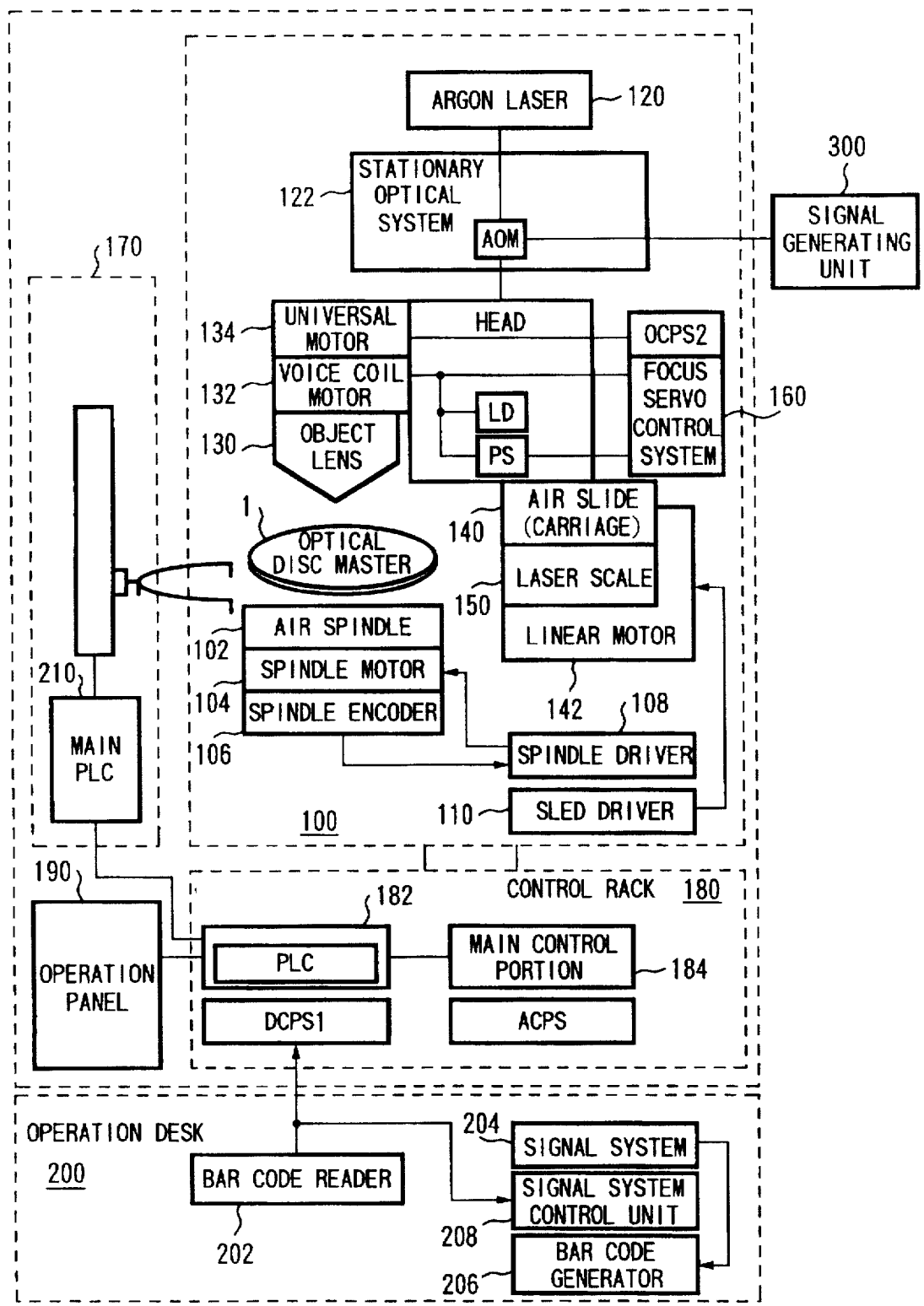
FIG. 1 is a view of the configuration of an apparatus for producing an optical disc of an embodiment of the present invention.

FIG. 1 is a view illustrating the configuration of an apparatus for producing an optical disc of the present invention. The optical disc device is configured by a spindle mechanism, an optical system, a head, a head movement mechanism, a servo control system, a signal generating unit, an optical disc master handling processing unit, and a signal processing and control operation unit.

The spindle mechanism 100 is the portion for driving the rotation of the optical disc master 1 and is constituted by an air spindle 102, a spindle motor 104, a spindle encoder 106, and a spindle driver 108.

The optical system has an argon laser 120 and a stationary optical system 122 including an optical modulation element (AOM) for modulating the recording data from the signal generating unit 300.

The signal generating unit 300, in the present invention, is provided with a plurality of signal generating devices and selects and drives the desired signal generating device so as to enable recording of various types of information such as only audio signals, audio and video signals, and data on to compact disc, Mini-Disc, digital video disc, and other various optical disc masters.

On the head are mounted an object lens 130 for emitting the light from the optical system to the optical disc master 1, a voice coil motor 132 for moving the position of the object lens 130, a universal motor 134, a laser diode (LD)

and a photo detector (PD) for detecting the signal for performing the tracking control of the head and the signal for performing the focus control, etc.

The head movement mechanism for moving the head in the radial direction of the optical disc master 1 is constituted by a sled driver 110, an air slide (carriage) 140, and a linear motor 142 linearly driving this air slide. The linear motor 142 is driven by the sled driver 110, and the head movement mechanism is moved in the radial direction of the optical disc master 1.

A laser scale 150 is integrally constituted with the air slide 140 and the linear motor 142 and detects the position of emission of the light from the object lens 130 for recording the data on the optical disc master 1. The detection signal of this laser scale 150 is used for the position control of the head movement mechanism.

The servo control system comprises a tracking, servo control system (not illustrated) for performing the control for making the head on which the object lens 130 is mounted track a predetermined position of the optical disc master 1 and a focus servo control system 160 for controlling the focal position by controlling the position of the object lens 130 facing the optical disc master 1.

An optical disc master handling processing unit 170 mounts the optical disc master 1 on the spindle mechanism before the recording of the information and removes the optical disc master 1 from the spindle mechanism after the recording of the information.

The signal processing and controlling operation unit has a programmable logic controller (PLC) 182 mounted on a control rack 180 and a main control portion 184 with a built-in computer. Further, the signal processing and controlling operation unit has an operation panel 190 for issuing various instructions to the programmable logic controller 182 in the control rack 180. Further, the signal processing and controlling operation unit has a bar code reader 202, a signal system 204, a bar code generator 206 for generating a bar code by a signal from this signal system 204, and an operation desk 200 having a signal system control unit 208. The signal processing and controlling operation unit has a main programmable logic controller 210 connected to the optical disc master handling processing unit 170.

Note that the present embodiment is configured so that the programmable logic controller 182 and the main programmable logic controller 210 are separated. In this example, the programmable logic controller 210 for performing the control of the spindle mechanism 100, the optical disc master handling processing unit 170, and other mechanisms is arranged in the vicinity of these mechanisms and is named the original main programmable logic controller since it performs the sequence control processing of the optical disc device, while the programmable logic controller 182 is added as an additional programmable logic controller 182 to be used for recording information on the optical disc master 1. Both of the main programmable logic controller 210 and the programmable logic controller 182 have the same fundamental processing functions and therefore it is also possible to integrally constitute them.

In the apparatus for producing an optical disc of the present invention, the programmable logic controller 182 performs the sequence control for recording the information on the optical disc master 1 and has the main control portion 184 perform the decision processing. That is, it delegates functions. The reason for this is that while the programmable logic controller 182 is better suited for the inherent sequence processing, the main control portion 184 is more suited to the decision processing, therefore the advantages thereof are combined.

Further, the present invention is configured so that various data processing on various optical disc masters are carried out based on the operating information set in the programmable logic controller 182 and the main control portion 184 from the operation desk 200. In the programmable logic controller 182 are incorporated fundamental sequence control operations such as the processing operations for selecting a signal generating device of the signal generating unit 300, the processing for operating the optical disc master handling processing unit 170, the spindle mechanism 100, etc. These operations are carried out based on the conditions set from the operation desk 200. Similarly, the main control portion 184 has a variety of functions, but the portion relevant to the present invention is configured so as to perform the decision processing based on the operating information set from the operation desk 200. Namely, a variety of operational processings are not installed in the form of software as in the conventional case. Only the fundamental operating functions are installed in the programmable logic controller 182 and the main control portion 184, so the optical disc device of the present invention is configured as a data dependent type (data oriented) control device based on the operating information (operating data) given from the operation desk 200 for the concrete operational processing.

For this reason, there is the advantage that the operating information can be produced even by the worker utilizing the apparatus for producing an optical disc.

Further, when the operating conditions are changed, it is sufficient to change the operating information by the signal system 204 in the operation desk 200 without the change of the software of the programmable logic controller 182 and the main control portion 184, convert the result of the change to a bar code by the bar code generator 206, and store the result thereof in the memory of the programmable logic controller 182 and the main control portion 184 read out by the bar code reader 202. Namely, even if the contents of the operational processing are changed, in the optical disc device of the present invention, it is not necessary to change the software (program) as in the conventional case, therefore there is the advantage that the user on the work floor (worker operating the apparatus for producing an optical disc) can perform the change without going through a programmer who knows the software well. Further, when constructing a program, program errors frequently occur, but in the present invention, the possibility of occurrence of this type of problem is very low. Further, in the conventional method, a long time is taken for confirmation and adjustment derived from the program errors, but in the method of the present invention, that problem becomes very small.

A specific example of the above content will be mentioned later.

The general operation of the apparatus for producing an optical disc illustrated in FIG. 1 will be explained referring to the flow chart illustrated in FIG. 2.

Pre-processing (processing for setting operating information): S1

In the usual operating pre-processing, the operating information necessary for recording the information which is to be recorded on the optical disc master 1 is read out by the bar code reader 202 of the operation desk 200 in accordance with that information and recorded in the memory of the programmable logic controller 182 of the control rack 180 and the memory of the main control portion 184. Accordingly, the signal system 204 and the bar code generator 206 read the data by the bar code reader 202 and prepare the operating information which is to be stored in the memory of the programmable logic controller 182 and the memory of the main control portion 184.

Placing of the optical disc master: S2

The optical disc master 1 which is to be recorded on is placed at a predetermined position of the spindle mechanism 100 using the optical disc master handling processing unit 170.

Initial operation: S3

Subsequently, a variety of initial operations of the apparatus for producing an optical disc are carried out. For example, the selection of the signal generating device of the signal generating unit 300 is carried out. Namely, the signal generating device in the signal generating unit 300 corresponding to the optical disc master 1 on which the information is to be recorded this time is selected, and the recording information from the selected signal generating device is AOM modulated in the stationary optical system 122 and emitted to the optical disc master 1 via the object lens 130. In addition to this, a variety of initial operations of the apparatus for producing an optical disc are carried out.

Cutting processing: S4

After the processing is carried out in this way, the optical disc master 1 is continuously recorded on (irradiated) in the manner explained below.

Based on the operating information from the operation desk 200, the processing for emitting modulated light on the optical disc master 1 is carried out in accordance with the information from the signal generating unit 300. During this operational processing, the main control portion 184 and the programmable logic controller 182 control the position of the air slide (carriage) 140 in accordance with the position detection signal from the laser scale 150. Further, the tracking servo control system (not illustrated) and the focus servo control system 160 perform the tracking servo control and the focus servo control based on the tracking error signal and the focus error signal detected by the photo detector (PD).

Based on the operating information given from the operation desk 200, the processing is performed for emitting the recording information on the optical disc master 1 placed on the spindle mechanism 100.

Processing for detachment of the optical disc master: S5

The optical disc master 1 placed on the spindle mechanism 100 is detached by the optical disc master handling processing unit 170.

The detached optical disc master 1 is then moved to the next processing step, where the development, fixing, stabilizing processing, etc. are carried out.

Below, the next optical disc master 1 is placed on the spindle mechanism 100 by the optical disc master handling processing unit 170 and processing similar to that mentioned above is carried out.

A more concrete explanation will be made mainly about the programmable logic controller 182, the main control portion 184, and the main programmable logic controller 210.

Figure 3:
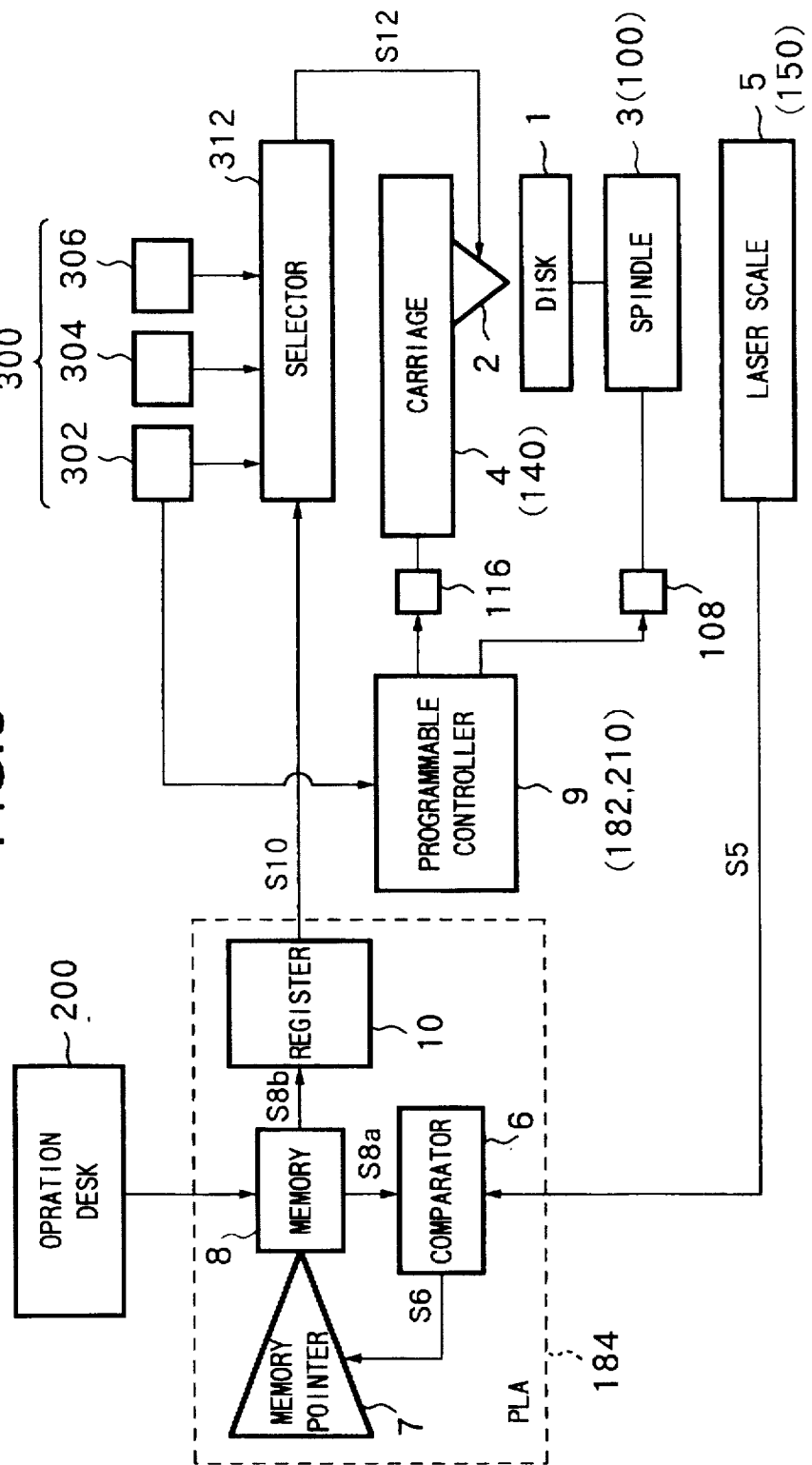
FIG. 3 is a view of the configuration of the apparatus for producing an optical disc according to an embodiment of the present invention in which the operational processing of the optical disc producing apparatus shown in FIG. 1 is emphasized.

FIG. 3 is a view of the configuration of the apparatus for producing an optical disc according to an embodiment of the present invention.

Figure 2:
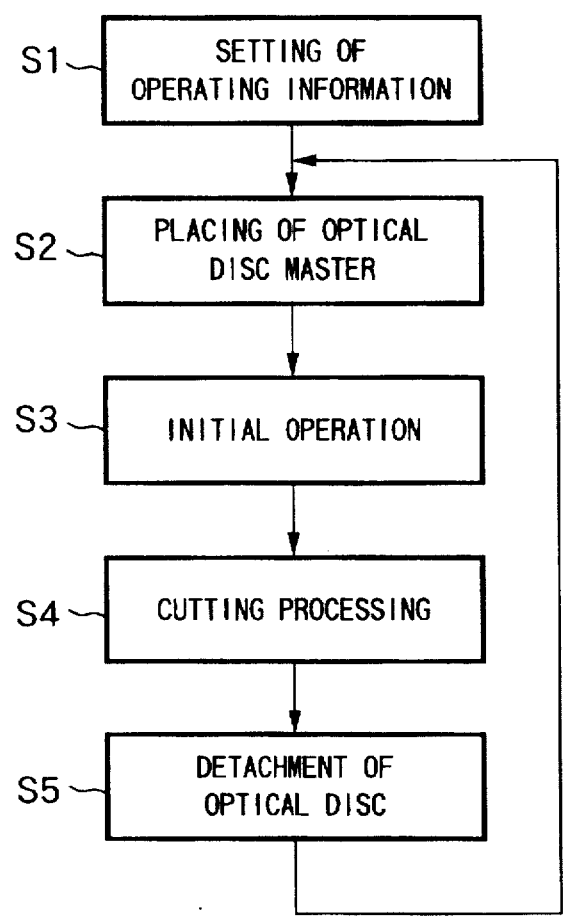
FIG. 2 is a flow chart showing the operation of the apparatus for producing an optical disc shown in FIG. 1.

The optical disc device illustrated in FIG. 2 schematically illustrates the mechanism etc. and shows the portion relevant to the programmable logic controllers 182 and 210 and the main control portion 184 in detail.

The optical disc device shown in FIG. 3 has a head 2 on which the object lens 130 illustrated in FIG. 1 etc. is mounted, a spindle mechanism 3 for rotating the optical disc master 1 (corresponding to the spindle mechanism 100 of FIG. 1), a carriage 4 for moving the head 2 in the radial direction of the optical disc master 1 (air slide (carriage) 140 of FIG. 1 etc.), and a laser scale 5 for detecting the position of the carriage 4 in the radial direction (laser scale 150 of FIG. 1). In FIG. 2, the argon laser 120 illustrated in FIG. 1, the stationary optical system 122, the focus servo control system 160, details of the spindle mechanism 100, the focus servo control system 160, the optical disc master handling processing unit 170, etc. are not illustrated.

The programmable controller 9 is shown as an example of the state where the programmable logic controller 182 and the main programmable logic controller 210 shown in FIG. 1 are integrally constituted.

The programmable controller 9 is connected to the portion indicated as the mechanical drive control unit 99 comprising as a whole the spindle driver 108, the sled driver 110, etc. illustrated in FIG. 1.

The portion illustrated as the signal generating unit 300 in FIG. 1 is provided with a signal generating device 302 for compact discs, a signal generating device 304 for Mini-Discs, a signal generating device 306 for CDROMs, etc. The signal of the signal generating device selected by the selector 312 is supplied to the optical modulation element (AOM) of the stationary optical system 122 of FIG. 1 as the recording information and modulated in accordance with the type of the optical disc master 1 and emitted from the object lens 130 to the optical disc master 1.

The main control portion 184 is provided with a comparator 6, a memory pointer 7, a memory 8, and a register 10. The comparator 6, memory pointer 7, memory 8, and register 10 are constituted by a programmable logic array (PLA), which is a type of applied specific integrated circuit (ASIC -semiconductor integrated circuit for specific purpose), in the present embodiment. It is also possible to configure them by using a microcomputer. In the following description, a case where the comparator 6, memory pointer 7, memory 8, and register 10 are configured by a programmable logic array will be explained. The memory 8 of the programmable logic array records the operating information read by the bar code reader 202 of the operation desk 200.

The spindle mechanism 3 controls the speed of the placed optical disc master 1 in response to the control instructions of the programmable controller 9 so as to turn the optical disc master 1 at a speed necessary for the cutting.

The carriage 4 moves the head 2 at the speed necessary for the cutting.

The laser scale 5 detects the relative positions of the optical disc master 1 and the head 2 and supplies a radial value S5, that is, the digital data obtained by expressing the position of the head 2 by the radius from the position of the substantial center of rotation of the optical disc master 1, to the comparator 6.

The comparator 6 compares the radial value S5 from the laser scale 5 and the radial information S8a from the memory 8. When they coincide with each other, it outputs a pulse signal S6 containing the pulse showing the coincidence to the memory pointer 7.

The memory pointer 7 receives as its input the pulse signal S6 from the comparator 6 and points to the address of the memory 8 in which the next radial information is stored whenever a pulse contained in the pulse signal S6 is detected.

The memory 8 stores the radial information and unit operating information exemplified in FIG. 3 given from the bar code reader 202 of the operation desk 200 as a pair, outputs the radial information S8a stored at the address indicated by the memory pointer 7 to the comparator 6, and, at the same time, outputs the unit operating information S8b paired with this output radial information S8a to the register 10.

FIG. 4 is a view of one example of the radial information and unit operating information to be stored in the memory 8, and FIGS. 5A to 5D are views showing the contents of the unit operating information.

The radial information indicates the radial position of the optical disc master 1. In the example shown in FIG. 3, the radial position indicated by the first radial information is 21.5 mm, the radial position indicated by the second radial information is 21.0 mm, the radial position indicated by the third radial information is 22.0 mm, and the fourth radial information indicates the end.

The unit operating information is comprised by a signal system flag, a mechanical flag, and an S- (signal) change data.

An example of the bits of the signal system flag is shown in FIG. 5A.

A seventh bit of "1" indicates the preparatory operation.
A sixth bit of "1" indicates an initialization operation.
A fifth bit of "1" indicates an operation for emitting recording information.
A fourth bit of "1" indicates the end of the processing.
The third to 0-th bits are not used.

From the above, when the settings of these bits, which are set from the operation desk 200 and stored in the memory 8, are determined, it can be found which operation the main control portion 184 of the optical disc device should perform.

FIG. 5B shows an example of the mechanical flag.

The mechanical flag shows the control operation of the mechanism by the contents of the 0-th to seventh bits and the contents of the eighth to 12-th bits.

These data are used as the control instructions of the programmable controller 9, indicating the programmable logic controller 182 and the main programmable logic controller 210.

0-th to seventh bits

0th bit: Initial setting of cutting operation-instruction for moving the head to the inner circumference of the optical disc master 1 at a high speed at the time of the initial operation First bit: Instruction for decelerating the feed speed of the carriage 4 from high speed to low speed Second bit: Instruction for performing the preparation and execution of the cutting Third bit: Instruction for ending a certain operation and starting the movement to the next step at a high speed Fourth bit: Instruction for ending a certain operation and starting the movement to the next step at a high speed Fifth bit: Instruction indicating the preparation and execution of the cutting operation Sixth bit: Not used Seventh bit: Instruction indicating a complete end of the cutting operation.

Eighth to 12-th bits

Eighth bit: When "1", instruction indicating the direction of the feed motion of the carriage 4 from the outer circumference to the inner circumference. When "0", instruction indicating the direction of the feed motion of the carriage 4 from the inner circumference to the outer circumference.

Ninth to 11-th bits: Bits indicating the control flag position shown in FIG. 5D. For example, a case of "000" indicates CLV-1, that is, an optical disc master 1 of the CLV format, and the fact that there is a signal system (condition ROM).

12-th bit: Bit indicating the existence of characters written inside the CD or other optical disc master 1.

FIGS. 5C and 5D show the contents of the bits of the S-change data (signal switching).

The S-change data is comprised of 3 bits, therefore it is possible to switch among eight signal generating devices in the signal generating unit 300 at the maximum, but in the present embodiment, the number of the signal generating devices is limited to four and the other bits are used for the instructions to turn the beam on and turn the beam off.

Also the contents of the S-change data are used for the switching of the selector 312 in the programmable logic controller 182.

The programmable controller 9 is connected to the memory 8 via the register 10. This stores the control routine for each routine for executing the unit operations and executes the control of the head 2, spindle 3, carriage 4, etc. by the corresponding control routine based on the unit operating information.

The register 10 stores the radial information S8a from the memory 8.

The signal generating unit 300 comprises a plurality of signal generating devices generating the signals serving as the source of the information to be recorded on the optical disc master 1. The selector 312 is driven by the programmable controller 9 by the selection number contained in the unit operating information S8b in accordance with the above S-change data, selects the information from one of the signal generating devices for generating the information which is to be recorded on the optical disc master 1, and outputs this selected signal as the cutting signal S12 to the stationary optical system 122 shown in FIG. 1.

The cutting signal is modulated at the optical modulation element (AOM) in the static optical system 122 and irradiated from the object lens 130 mounted on the head 2 to the optical disc master 1.

Below, an explanation will be made of the operation of the apparatus for producing an optical disc shown in FIG. 3. The operation of the apparatus for producing an optical disc illustrated in FIG. 3 is basically the same as the operation of the apparatus for producing an optical disc illustrated in FIG. 1, but here details of operating of the programmable controller 9 serving as the second controlling means, the programmable logic array comprising the comparator 6 serving as the first controlling means, the memory pointer 7, the memory 8, and the register 10 illustrated in FIG. 3 will be explained.

Preparatory operation (operation for setting operating information): S1

As mentioned above referring to FIG. 2, the operating information explained above is recorded in the memory 8 by using the bar code reader 202 in the operation desk 200.

Placing of optical disc master: S2

The optical disc master 1 is placed on the spindle mechanism 3 by using the optical disc master handling processing unit 170 under the control of the programmable controller 9 (main programmable logic controller 210 of FIG. 1).

Initial operation: S3

Subsequently, the initialization operation of the entire apparatus for producing an optical disc is carried out in accordance with an operation from for example the user. In this initialization operation, the head 2 is returned to the origin using the programmable controller 9 (programmable logic controller 182), the states of the spindle mechanism 3 and the carriage 4 are set, the laser scale 5 is calibrated, the register 10 is cleared, and the memory pointer 7 is initialized.

When the initialization is carried out, the first radial information stored in the memory 8 is pointed to by the memory pointer 7 and, at the same time, the first unit information is held in the register 10.

Cutting operation: S4

The apparatus for producing an optical disc starts the cutting operating after the completion of the initialization operation. During the cutting operation, the carriage 4 is in constant operation. As a result, the radial value S5 output from the laser scale 5 is constantly changing. Then, the comparator 6 compares the radial value S5 from the laser scale 5 and the radial information S8b stored in the memory 8 and outputs a pulse signal S6 containing pulses corresponding to the coincidence of them to the memory pointer 7.

When this pulse signal S6 is input to the memory pointer 7, the address at which the next radial information is stored is pointed to by the memory pointer 7 based on the pulse contained in the pulse signal S6 and the next unit operating information paired with the pointed radial information is output from the memory 8 to the register 10 and stored in the register 10. Then, the programmable controller 9 carries out the control of the operating portions based on the next unit operating information stored in the register 10. Further, the switching control by the selector 312 is carried out based on the selection number contained in the unit operating information stored in the register 10, and the selected cutting signal S12 is output to the head 2.

Thereafter, as mentioned above, whenever the radial value S5 coincides with the radial information S8b, the radial information next to this is pointed to by the memory pointer 7, the unit operating information corresponding to the radial information is stored in the register 10, and the processing based on the stored unit operating information is sequentially carried out.

Then, when the radial value S5 and the radial information S8b once before the end coincide with each other, the final unit operating information is stored in the register 10.

Here, preferably, as the radial information once before the end, information indicating the radial position in the vicinity of the origin of the head 2 (the final radial information is the seventh bit of the mechanical flag of FIG. 5B) is used. The reason for this is that there is no "stop instruction" in this embodiment. By this, at the time of the end of the operation of the apparatus for producing an optical disc, the operating portion can be returned to the vicinity of the origin of the start of the cutting (recording).

Further, the final unit operating information contain the stopping command of the carriage 4 and the stopping command of the other operating portions. All operating portions stop by this, whereby the cutting operation is ended.

When the carriage 4 stops, the radial value S5 output from the laser scale 5 becomes a constant value. As a result, a pulse indicating the coincidence at the comparator 6 is no longer generated, and the operation of the apparatus for producing an optical disc stops.

Detachment of optical disc master: S5

The optical disc master 1 for which the recording processing is ended is detached from the spindle mechanism 3 by using the optical disc master handling processing unit 170 shown in FIG. 1.

A more concrete explanation will be made next of the operation of the apparatus for producing an optical disc carried out based on the radial information and the unit operating information shown in FIG. 3.

The memory pointer 7 points to the address at which the first radial information and unit operating information are stored. By this, the first unit operating information S8b is output from the memory 8 to the register 10. This first unit operating information S8b is stored in the register 10. The first unit operating information is paired with the radial information indicating the radial position 21.5 mm as shown in FIG. 4. The 0-th bit and eighth bit of the mechanical flag are "1", and the other bits are "0". Namely, the first unit operating information sets the cutting initialization shown in FIG. 5B and the direction of feed motion from the outer circumference to the inner circumference of the optical disc master 1.

The respective operating portions are controlled by the programmable controller 9 based on the first unit operating information stored in the register 10, the initialization operation is carried out, and, at the same time, the carriage 4 moves in the feed direction from the outer circumference to the inner circumference of the optical disc master 1 at a high speed.

Next, during the time when the carriage 4 moves toward the inner circumference of the optical disc master 1, the comparator 6 detects any coincidence between the radial value S5 output from the laser scale 5 and the radial position 21.5 mm indicated by the first radial information pointed to by the memory pointer 7. Namely, when the carriage 4 reaches the radial position 21.5 mm on the optical disc master 1, a pulse signal S6 indicating coincidence is output to the memory pointer 7, the memory pointer 7 points to the address at which the second radial information is stored, and the second unit operating information S8b paired with this second radial information is output from the memory 8 to the register 10 and stored in the register 10. Here, in the second unit operating information, as shown in FIG. 4, the first bit and eighth bit of the mechanical flag have become "1" and the other bits have become "0". Namely, the second unit operating information sets the deceleration of the feed speed and the direction of feed motion from the outer circumference to the inner circumference of the optical disc master 1 as shown in FIG. 5B. Further, in the second unit operating information, as shown in FIG. 4, the ninth, 10-th, and 11-th bits are "0", so the recording format is CLV-1 based on FIG. 5D.

The respective operating portions are controlled by the programmable controller 9 based on the second unit operating information stored in the register 10, the carriage 4 moves in the inner circumferential direction while decelerating, and the carriage 4 starts the rotation.

During the time when the carriage 4 moves toward the inner circumference while decelerating, the comparator 6 detects coincidence between the radial value S5 output from the laser scale 5 and the second radial information indicating the radial position 21.0 mm pointed to by the memory pointer 7. Then, the pulse signal S6 indicating coincidence is output to the memory pointer 7, the memory pointer 7 points to the address at which the third radial information is stored, and the unit operating information S8b paired with this third radial information is output from the memory 8 to the register 10 and stored in the register 10. Here, in the third unit operating information, as shown in FIG. 3, the second bit and ninth bit of the mechanical flag have become "1", and the other bits have become "0". Namely, the third unit operating information sets the preparation and execution of the cutting operation (first process) and the direction of feed motion from the inner circumference to the outer circumference of the optical disc master 1. Further, the recording format is CLV-2.

Then, the respective operating portions are controlled by the programmable controller 9 based on the third unit operating information stored in the register 10, and the cutting operation is carried out.

During the time when the cutting operation is carried out, the comparator 6 detects coincidence between the radial value S5 output from the laser scale 5 and the third radial information indicating the radius position 22.0 mm stored in the register 10. Then, the pulse signal S6 indicating the coincidence is output to the memory pointer 7, the memory pointer 7 points to the address at which the fourth (last) radial information is stored, and the fourth unit operating information S8b paired with this fourth radial information is output from the memory 8 to the register 10 and stored in the register 10. Here, in the fourth unit operating information, as shown in FIG. 4, the seventh bit of the mechanical flag has become "1", and the other bits have become "0". Namely, the fourth unit operating information indicates a complete end as shown in FIG. 5B.

Then, the respective operating portions are controlled by the programmable controller 9 based on the third unit operating information stored in the register 10, the end processing is carried out, and the processing stops.

As explained above, according to the apparatus for producing an optical disc according to the present embodiment, the programmable controller 9 operates only based on the unit operating information (operating information set from the bar code reader 202 of the operation desk 200) sequentially stored in the register 10 in accordance with the movement of the head 2 based on the decision on conditions of the main control portion 184 (FIG. 1) constituted by the comparator 6, memory pointer 7, memory 8, and the register 10, therefore it becomes unnecessary to base the operation on large scale software including all operations having the possibility of execution as in the conventional case, the process of development of the entire apparatus including the software can be simplified, the work involved in the development can be reduced, and, at the same time, the cost of the production can be reduced.

Further, for example, it becomes possible to flexibly handle changes in the operation of the apparatus for producing an optical disc accompanying a change of specifications of the optical disc master 1 etc. Further, it becomes possible to flexibly and quickly handle changes in the conditions during the operation of the apparatus for producing an optical disc.

The present invention is not limited to the above embodiments. For example, the content of the unit operating information shown in FIG. 4 and the contents of signal system flag, mechanical flag, and the S-change data shown in FIGS. 5A to 5D may be freely set.

Further, the operation desk 200 shown in FIG. 1 is not limited to a bar code reader 202 for input of the operating information. It is also possible to set the operating information from a keyboard or the like to the main control portion 184 and the programmable logic controller 182.

As explained above, according to the data oriented apparatus for producing an optical disc of the present invention, which performs the control processing based on operating information, it is not necessary to prepare large scale software as in the conventional case, the process of development of the entire apparatus including the software can be simplified, the work involved in the development can be reduced, and, at the same time, the cost of the production can be reduced.

Further, according to the apparatus for producing an optical disc of the present invention, a flexible coping becomes possible with respect to the change of operating accompanied with the change of the standard of the optical disc master, etc.

Further, according to the apparatus for producing an optical disc of the present invention, since the position in the vicinity of the origin of the optical disc master for starting the recording is used as the positional information corresponding to the operating information used once before the end in the controlling means, the relative positions of the laser emitting means and the optical disc master can be returned to the starting point of the operation at the time of the end of the operation. For this reason, there is an advantage that the operating information can be generated even by the worker utilizing the apparatus for producing an optical disc.

What is claimed is:

1. An apparatus for producing an optical disc which optically records information on an optical disc master, comprising:

signal generating means for generating the information which is to be recorded on the optical disc master;

light emitting means having light modulating means for modulating light emitted from the light emitting means and forming modulated light by the information from the signal generating means and emitting the modulated light to the optical disc master;

head moving means for moving relative to the optical disc master a head mounting an optical system for irradiating the light from the light emitting means to a predetermined position of the optical disc master;

position detecting means for detecting a position of the head moving means with respect to the optical disc master;

recording means in which a format of the optical disc master, the type of the information which is to be recorded on the optical disc master, radial information of the optical disc master, operating conditions of the head moving means, and an operating state of the apparatus for producing said optical disc are preliminarily set as a series of set operating information; and controlling means for reading said series of set operating information, comparing the radial information of the optical disc master and an output from the position detecting means, and performing control for irradiating the modulated light in accordance with the information output from the signal generating means to the optical disc master based on the set operating information in accordance with the position of the head moving means with respect to the optical disc master.

2. The apparatus for producing an optical disc as set forth in claim 1, wherein the controlling means has:

first controlling means for performing sequence control based on the set operating information and performing movement control of the head moving means and second controlling means for performing a decision on the operating conditions by comparing set radial information of the series of set operating information of the optical disc master and a position signal from the position detecting means and controlling the first controlling means.

3. The apparatus for producing an optical disc as set forth in claim 1, wherein the first controlling means has a programmable logic controller.

4. The apparatus for producing an optical disc as set forth in claim 2, wherein the second controlling means has:

a memory in which the set operating information is recorded;

a comparator for performing the decision on the conditions by comparing the radial information recorded in the memory and the position signal from the position detecting means; and a memory pointer for proceeding to a next one of the set operating information recorded in the memory in accordance with a result of the comparing and decision of the comparator.

5. The apparatus for producing an optical disc as set forth in claim 4, wherein the second controlling means is constituted by a programmable logic array.

6. The apparatus for producing an optical disc as set forth in claim 4, wherein the second controlling means is constituted by a computation controlling means.

7. The apparatus for producing an optical disc as set forth in claim 1, wherein the light emitting means is a laser.

8. The apparatus for producing an optical disc as set forth in claim 1, wherein:

the signal generating means has a plurality of signal generating devices for generating the information which is to be recorded in accordance with a plurality of types of optical disc masters; and the first controlling means selects the information based on the set operating information and makes the light emitting means output the information.

9. A method of producing an optical disc which optically records information on an optical disc master, comprising the steps of:

preliminarily setting a format of the optical disc master, the type of the information which is to be recorded on the optical disc master, radial information of the optical disc master, operating conditions of a head moving device, and an operating state of an apparatus for producing an optical disc as a series of data;

placing the optical disc master which is to be recorded on at a predetermined position;

cutting and optically recording the information from a signal generator on the optical disc master based on a set series of operating information; and removing the optical disc master on which the information is recorded from a predetermined position.

10. The method of producing an optical disc as set forth in claim 9, wherein, in the cutting step, the set series of operating information is read by using a controller; the radial information of the optical disc master and a reading from a position detecting means for detecting a position of a head with respect to the optical disc master are compared; and light modulated in accordance with a signal output from the signal generator to the optical disc master is irradiated to the optical disc master based on the set series of operating information in accordance with the position of a head moving device for moving the head with respect to the optical disc master.

11. The method for producing an optical disc as set forth in claim 9, wherein the set series of operating information is set based on data read by a bar code reader.

12. The method of producing an optical disc as set forth in claim 9, wherein a position in a vicinity of an origin for starting the recording on the optical disc master is used as position information corresponding to the set series of operating information used once before an end in the controller.

13. An apparatus for producing an optical disc which emits a laser beam to an optical disc master in a pattern in accordance with the information to be recorded to record the information and produce the optical disc, comprising:

laser emitting means for emitting the laser beam;

moving means for moving the laser emitting means and the optical disc master relative to each other;

position detecting means for detecting a position of the optical disc master to which the laser beam is emitted;

memory means for storing a plurality of position information concerning the position of the optical disc master and a plurality of operating information corresponding to the plurality of position information;

comparing means for comparing the position detected by the position detecting means and the position indicated by the plurality of position information and detecting a coincidence thereof; and controlling means for performing a predetermined control based on the next of said plurality of operating information when the coincidence is detected by the comparing means.

* * * * *